United States Patent
Tajima et al.

(10) Patent No.: US 7,912,487 B2
(45) Date of Patent: Mar. 22, 2011

(54) MOBILE COMMUNICATION SYSTEM, BASE STATION, TERMINAL DEVICE, AND TRANSMISSION CONTROL METHOD

(75) Inventors: Yoshiharu Tajima, Kawasaki (JP); Kazuo Kawabata, Kawasaki (JP); Yoshiaki Ohta, Kawasaki (JP); Kazuhisa Obuchi, Kawasaki (JP); Hideto Furukawa, Kawasaki (JP); Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 11/696,710

(22) Filed: Apr. 4, 2007

(65) Prior Publication Data

US 2008/0032726 A1 Feb. 7, 2008

(30) Foreign Application Priority Data

Aug. 7, 2006 (JP) .................. 2006-214639

(51) Int. Cl.
*H04B 7/00* (2006.01)
(52) U.S. Cl. ............. 455/509; 455/522; 455/456.3; 455/67.13; 370/315; 370/328; 370/252
(58) Field of Classification Search .......... 370/209, 370/329, 317–318; 455/67.11, 69, 452, 3.01, 455/456, 522; 725/63
See application file for complete search history.

(56) References Cited

U.S. PATENT DOCUMENTS

| | | | |
|---|---|---|---|
| 6,091,955 A | | 7/2000 | Aalto et al. |
| 6,144,858 A * | | 11/2000 | Masuda ............... 455/456.3 |
| 6,845,246 B1 * | | 1/2005 | Steer .................... 455/522 |
| 7,130,587 B2 * | | 10/2006 | Hikokubo et al. ....... 455/67.11 |
| 2002/0015382 A1 | | 2/2002 | Fukuda |
| 2002/0036985 A1 * | | 3/2002 | Jonas et al. ............. 370/235 |
| 2002/0108116 A1 * | | 8/2002 | Dillon .................... 725/63 |
| 2003/0087644 A1 * | | 5/2003 | Miyoshi et al. ........... 455/452 |
| 2004/0097238 A1 | | 5/2004 | Hwang et al. |
| 2004/0224712 A1 * | | 11/2004 | Tiedemann et al. ....... 455/518 |
| 2005/0163067 A1 | | 7/2005 | Okamoto et al. |
| 2006/0203713 A1 * | | 9/2006 | Laroia et al. ............. 370/209 |
| 2007/0032256 A1 * | | 2/2007 | Kolze ..................... 455/522 |

(Continued)

FOREIGN PATENT DOCUMENTS

CN 1555136 12/2004

(Continued)

OTHER PUBLICATIONS

3GPP TR 25.913 V7.2.0 (Dec. 2005)—pp. 6-7, see 5. Objectives.
3GPP TSG RAN WG1 Meeting #43, Seoul, Korea, Nov. 7-11, 2005, R1-051341, pp. 1-7, see 2. Flexible Fractional Frequency Reuse.

(Continued)

*Primary Examiner* — Robert W Wilson
*Assistant Examiner* — Mohamed Kamara
(74) *Attorney, Agent, or Firm* — Myers Wolin, LLC (57) ABSTRACT

A mobile communication system in which, when transmission is performed from a base station to a terminal device, a modulation scheme is designated, from among at least two modulation schemes with different modulation levels, on the basis of reception quality at the terminal to perform transmission from the base station. The system includes a base station transmitting at a first transmission power using a frequency designed for, in a channel allocation scheme of the system, not causing interference with an adjacent base station and using a first modulation scheme, and a second channel transmitting at a second transmission power lower than the first transmission power, and when the base station uses the second channel, a second modulation scheme having a lower modulation level than the first modulation scheme is designated, and communication is performed.

12 Claims, 6 Drawing Sheets

U.S. PATENT DOCUMENTS

2008/0160921 A1* 7/2008 Li et al. .................... 455/67.13
2009/0023382 A1* 1/2009 Yoshida et al. ............. 455/3.01

FOREIGN PATENT DOCUMENTS

| | | |
|---|---|---|
| JP | 10-511254 A | 10/1998 |
| JP | 2002-101043 | 4/2002 |
| JP | 2003-304214 A | 10/2003 |
| JP | 2004-159345 A | 6/2004 |
| JP | 2001-359152 A | 4/2007 |

OTHER PUBLICATIONS

Yoshiaki Ofuji et al., "Comparison of Packet Scheduling Methods Focusing on Throughput of Each User in High Speed Downlink Packet Access," Wireless Laboratories, NTT DoCoMo, Inc., Technical Report of IEICE, Mar. 7, 2002, pp. 51-53, see English translation of p. 52, Section 1 and pp. 52-53, Section 2.

The State Intellectual Property Office Of China "First Notification of Office Action" for corresponding patent application No. 200710107735, dated Apr. 28, 2010. English translation attached.

* cited by examiner

| | ASSIGNMENT OF CHANNELS | TRANSMISSION POWER | MODULATION SCHEME |
|---|---|---|---|
| CELL CENTER | THE FIRST CHANNEL | HIGH | 16QAM |
| | NOT THE FIRST CHANNEL | LOW | QPSK |
| CELL BOUNDARY | THE FIRST CHANNEL | HIGH | QPSK |
| | NOT THE FIRST CHANNEL | NOT USED | |

|  | ASSIGNMENT OF CHANNELS | TRANSMISSION POWER | MODULATION SCHEME |
| --- | --- | --- | --- |
| CELL CENTER | THE FIRST CHANNEL | HIGH | 16QAM |
|  | NOT THE FIRST CHANNEL | HIGH | QPSK |
| CELL BOUNDARY | THE FIRST CHANNEL | HIGH | QPSK |
|  | NOT THE FIRST CHANNEL | NOT USED | |

MOBILE COMMUNICATION SYSTEM, BASE STATION, TERMINAL DEVICE, AND TRANSMISSION CONTROL METHOD

TECHNICAL FIELD

The present invention relates to mobile communication systems, and more specifically to a mobile communication system, a transmission control method, a terminal device, and a base station for performing communication by changing a modulation scheme.

BACKGROUND ART

Third-generation mobile communication systems for mobile phones, etc., such as cdma 2000 and W-CDMA using a spread spectrum (Code Division Multiple Access: hereinafter referred to as "CDMA") scheme, have been used. For a W-CDMA downlink, a 3.5th-generation packet transmission scheme called HSDPA (High-Speed Downlink Packet Access) is known as a packet data transmission technique for providing a transmission rate of up to about 14 Mbps.

HSDPA employs an adaptive coding modulation scheme (AMC: Adaptive Modulation and Coding) that allows transmission at a power receivable by all terminal devices located within an area covered by a base station and that allows an optimum modulation scheme to be used depending on the radio wave conditions (CQI information) between the base station and the terminal device, thereby achieving high-quality and high-speed communication. There are available, as modulation schemes, a QPSK modulation scheme with high stability like W-CDMA, which is one type of PSK (Phase Shift Keying) modulation scheme, and a 16-QAM scheme allowing high-speed communication, which is one type of QAM (Quadrature Amplitude Modulation) modulation scheme. Those two modulation schemes are currently used. However, the PSK schemes further include BPSK and 8PSK in addition to QPSK, and the QAM schemes further include 64-QAM and 256-QAM in addition to 16-QAM. That is, there are modulation schemes with different modulation levels.

The above-mentioned CQI (Channel Quality Indicator) information is a result of measurement of the signal quality (for example, SIR) by the terminal device from CPICH (common pilot channel) received from the base station. The CQI information is transmitted to the base station via HS-DPCCH (High Speed Dedicated Physical Control Channel.

Primary radio channels for use in HSDPA include HS-PDSCH (High Speed-Physical Downlink Shared Channel) and HS-SCCH (High Speed-Shared Control Channel) as shared channels in the downlink direction (from the base station to the communication terminals). HS-SCCH is a control channel carrying various control information, such as address information and a modulation scheme of packet data to be transmitted via HS-PDSCH, and error correction parameters. The terminal device receives HS-SCCH, and can recognize the modulation scheme used for the HS-PDSCH, the error correction parameters, etc., to perform demodulation and decoding for the HS-PDSCH.

Further, HSDPA employs a method in which one physical channel is shared in time division and is used by a plurality of communication terminals. A scheduler located in the base station performs scheduling to determine a communication terminal to which packet data is to be transmitted and transmission parameters of the packet data in predetermined units of time according to the amount of data to be transmitted to the communication terminal, the communication quality, and the priority, thereby achieving efficient packet data transmission.

Several algorithms for the scheduler to determine the transmission parameters have been proposed. A Max CIR (Maximum Carrier to Interface power Ratio) method, an RR method (Round Robin) method, and a PF (Proportional Fairness) method that allow efficient scheduling are known. For example see Yoshiaki Oofuji, et. al., "Kudari Rink Kosoku Paketto Akusesu ni okeru kaku Yuza no Suruputto ni Chumoku shita Sukejuringuhou no Tokusei Hikaku (Characteristic Comparison between Scheduling methods focusing on Throughput of Each User in High-Speed Downlink Packet Access)," Technical Report of IEICE SST2001-108. A•P2001-256. RCD2001-291, MoMuC2001-88, MW2001-226 (2002-03).

In the Max CIR method, a user having the highest transmission rate is preferentially assigned a slot on the basis of the reported SIRs at the terminals. In the RR method, all users are equally assigned slots regardless of the SIR. In the PF method, a terminal device having the highest ratio of an average reception SIR value for the terminal device to the instantaneous SIR of each user is assigned a slot. Which algorithm is to be selected depends on what evaluation amount is to be prioritized for a system.

In order to realize a mobile communication scheme that allows higher-speed communication, studies on fourth-generation communication schemes have been extensively carried out. Further, in 3GPP ($3^{rd}$ Generation Partnership Project), studies on an LTE (Long Term Evolution) scheme, which is considered as the 3.9th generation, have been made. As an LTE communication scheme, orthogonal frequency division multiplexing (hereinafter referred to as "OFDM") is used, instead of the CDMA scheme, for realizing high-speed communication (for example, see 3GPP TR25.913 standard).

The OFDM scheme employs a method in which a carrier for modulating data is divided into a plurality of sub-carriers orthogonal to each other and data signals distributed to the sub-carriers are transmitted in parallel. By performing transmission while maintaining the straight-traveling characteristics between the plurality of sub-carriers, optimum transmission efficiency for high-speed data communication can be attained.

In mobile communication based on the OFDM scheme, unlike the CDMA scheme, no spread code is used, and there is a problem in that adjacent base stations may interfere with each other when using the same channel at the same time. Therefore, each base station needs to use a different channel. However, if available channels are limited, the number of users that can be accommodated is also limited. Thus, because of the limited number of available channels, it is desirable that adjacent base stations can use the same channel.

Figure 1:
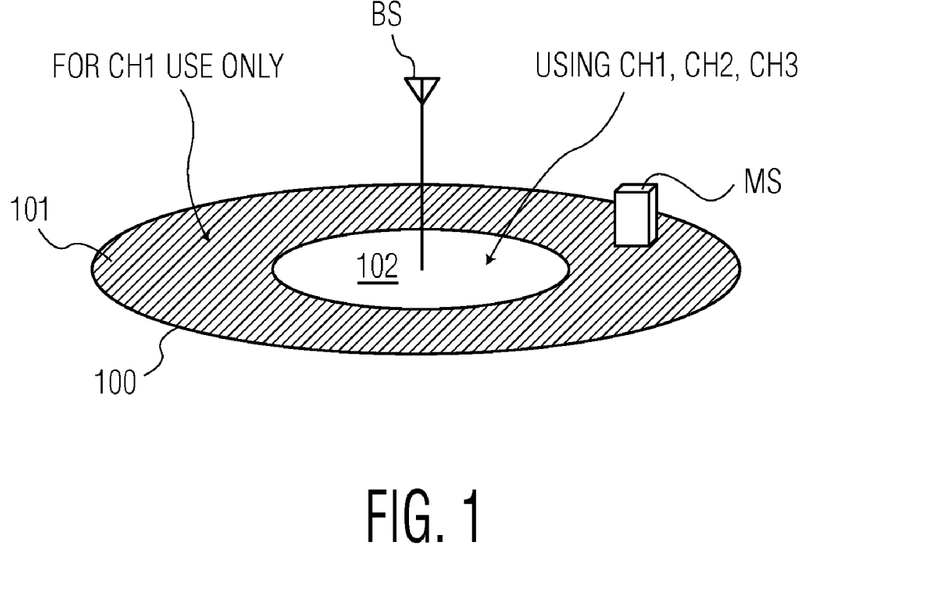
FIG. 1 illustrates a structure of a mobile communication system.

In order to solve this problem, a method in which a frequency reuse distance is variably set according to the distance from a terminal device to a base station has been proposed (see for example 3GPP TSG-RAN WG1 Tdoc R1-051341). For example, as shown in FIG. 1, in a case where the total number of channels (a plurality of sub-carriers orthogonal to each other) available for communication is three, namely, CH1, CH2, and CH3, a terminal device (for example MS) that is distant from the base station (in a cell boundary area 101) is permitted to use only the CH1 by increasing the reuse distance of CH1, and is not permitted to use the same frequency as an adjacent base station, thereby minimizing any interference on neighboring cells. A terminal device that is close to the base station (in a cell center area 102) is permitted to use all the frequency channels CH1, CH2, and CH3, thus reducing the reuse distance, thereby increasing the channel use efficiency.

However, in considering a case where the conventional HSDPA scheme is directly used for OFDM communication in the downlink direction, there is a problem in that since a base station performs transmission to terminal devices at a power that allows transmission signals to reach terminal devices located in a distant area from the base station (the cell boundary area 101 shown in FIG. 1), the above-mentioned method in which the frequency reuse distance is variably set cannot be used for communication in the downlink direction, thus causing interference in a communication area of an adjacent base station.

In a case where HSUPA (High Speed Uplink Packet Access) for communication in the uplink direction, which corresponds to HSDPA, is used in the OFDM scheme, there is a problem in that since a terminal device performs transmission at a power that allows a transmission signal to reach a base station even if the terminal device is located anywhere in the communication area, interference may occur in a communication area of an adjacent base station.

The above-mentioned problems with a conventional mobile communication system that uses the HSDPA and HSUPA schemes for the OFDM scheme will be described with reference to FIGS. 2 and 3. It is assumed that the mobile communication system is composed of base stations BS1 and BS2 and terminal devices MS1 and MS2, and that the total number of channels available is three, namely, CH1, CH2, and CH3.

A cell 100-1 that is a communication area of the base station BS1 can be divided into a cell boundary area 101-1 and a cell center area 102-1. In the cell boundary area 101-1, an adjacent frequency reuse distance is increased, and only CH1, which is a channel (hereinafter referred to as a "first channel") assigned so as not to interfere with an adjacent base station, is used. In the cell center area 102-1, the frequency reuse distance is reduced, and all the channels CH1, CH2, and CH3 are used. The channels (CH2 and CH3) other than the first channel are hereinafter referred to as "second channels."

A cell 100-2 that is a communication area of the base station BS2 can also be divided into a cell boundary area 101-2 and a cell center area 102-2. In the cell boundary area 101-2, only the CH1, which is a channel assigned as the first channel, is used. In the cell center area 102-2, all of the first channel CH1 and the second channels CH2 and CH3 can be used.

Under this constraint, the terminal device MS1 is located in the cell center portion 102-1, and can use all the channels CH1, CH2, and CH3. The terminal device MS2 is located in the cell boundary area 101-2, and can use only CH1.

Figure 2:
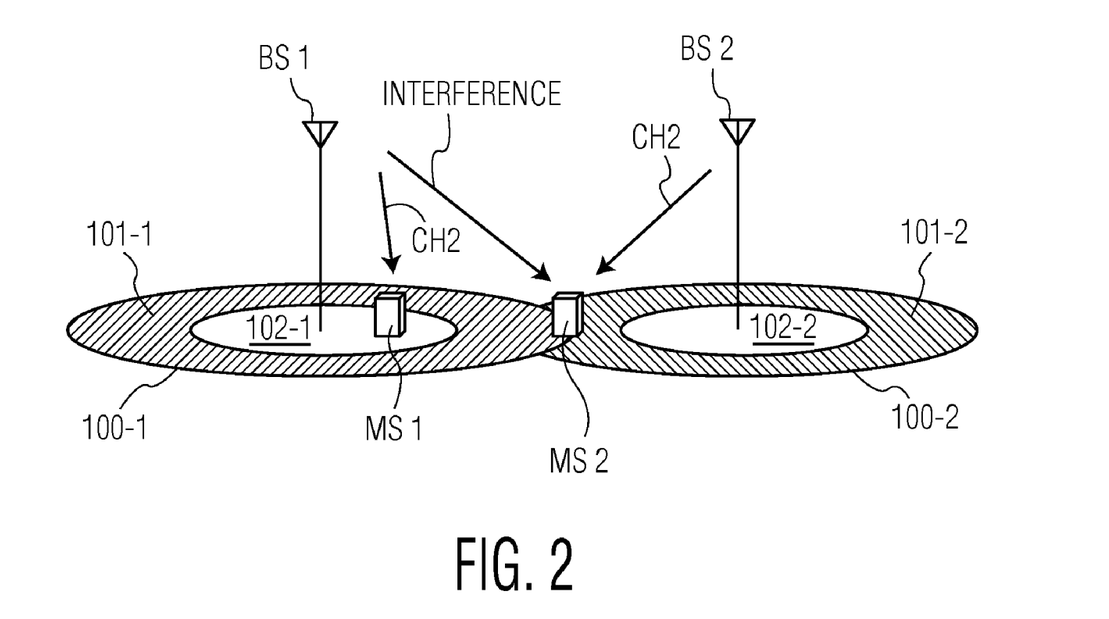
FIG. 2 illustrates a problem with the conventional mobile communication system.

As shown in FIG. 2, if the terminal device MS1 uses the CH2, TPC (transmission power control) is used for transmission via the individual channels to reduce the transmission power from the base station BS1 to the terminal device MS1, resulting in no interference with the adjacent cell 100-2. However, in a case where a transmission method using a shared channel, such as HSDPA, is used, the TPC control is not carried out, and transmission is performed at a power that covers the entire cell. Thus, the base station BS1 performs transmission to the terminal device MS1 located in the cell center area 102-1 at the same power as that for a terminal device located in the cell boundary area 101-1. Therefore, communication in the downlink direction using the CH2 from the base station BS1 causes interference with the terminal device MS2.

Figure 3:
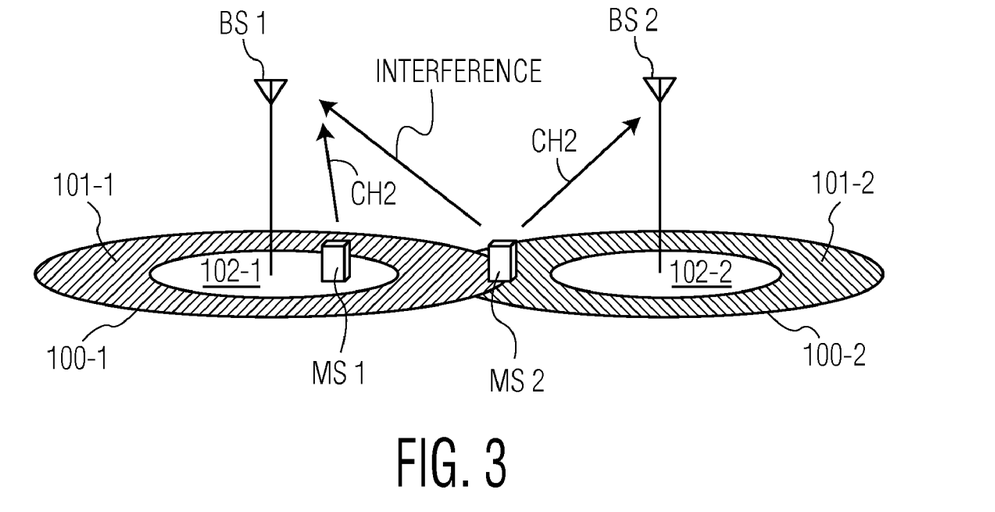
FIG. 3 illustrates another problem with the conventional mobile communication system.

If both the terminal devices MS1 and MS2 share the CH2 in the HSUPA scheme, as shown in FIG. 3, the MS2 performs transmission at a power sufficient to reach the base station BS2 from the cell boundary area, however communication in the uplink direction from the terminal device MS2 causes interference with the base station BS1.

SUMMARY OF THE INVENTION

In view of the foregoing problems and to achieve the object, in an exemplary embodiment of the present invention, there is provided A base station including a terminal position determining unit determining a relative position of a terminal within a cell radius; a receiver receiving signals from the terminal; a transmitter transmitting signals to the terminal; and a control unit, in dependence upon the relative position of the terminal, setting a channel, a transmission power and a modulation scheme for communication with the terminal. The base station sets the modulation scheme from among at least two modulation schemes with different modulation levels and sets the channel from among at least two channels having frequencies different from each other.

In another embodiment a terminal in a mobile communication system includes a terminal position determining unit determining a relative position of the terminal within a cell radius; a receiver receiving signals from a base station; a transmitter transmitting signals to the base station; and a control unit, in dependence upon the position of the terminal, setting a channel, a transmission power and a modulation scheme for uplink communication with the base station. The terminal sets the modulation scheme from among at least two modulation schemes with different modulation levels and sets the channel from among at least two channels having frequencies different from each other.

A further embodiment includes a mobile communication system in which, when transmission is performed from a base station to a terminal device, a modulation scheme is designated, from among at least two modulation schemes with different modulation levels, on the basis of reception quality at the terminal to perform transmission from the base station. The mobile communication system includes a base station transmitting at a first transmission power using a frequency designed for, in a channel allocation scheme of the system, not causing interference with an adjacent base station and using a first modulation scheme, and a second channel transmitting at a second transmission power lower than the first transmission power, and when the base station uses the second channel, a second modulation scheme having a lower modulation level than the first modulation scheme is designated, and communication is performed. This embodiment may be further defined as including the base station, when transmitting at the first transmission power using the frequency designed for not causing interference with an adjacent base station, further selecting between the first modulation scheme and the second modulation scheme depending upon the reception quality.

Another embodiment of the invention includes a mobile communication system in which, when transmission is performed from a terminal device to a base station, a modulation scheme is designated, from among at least two modulation schemes with different modulation levels, on the basis of reception quality at the base station to perform transmission from the terminal device. The mobile communication system includes a terminal device having a first channel using a frequency designed for, in a channel allocation scheme of the system, not causing interference with an adjacent base station, and a second channel using a frequency different from the first channel, and when the terminal device uses the second channel, a power equivalent to a transmission power used when the first channel is used is designated as a transmission power, a modulation scheme having a lower modulation level is designated from among modulation levels of the modulation schemes, and communication is performed. The mobile communication system may optionally be further defined as the terminal, when transmitting using the frequency designed for not causing interference with an adjacent base station, further selecting between the modulation scheme having the lower modulation level and another modulation scheme having a higher modulation level depending upon the reception quality.

The present invention further includes a method in which, when transmission is performed from a base station to a terminal device, a modulation scheme is designated from among at least two modulation schemes with different modulation levels on the basis of reception quality at the terminal to perform transmission from the base station. The method including assigning, by the base station, a first channel for transmitting at a first transmission power using a frequency designed for, in a channel allocation scheme, not causing interference with an adjacent base station and a second channel for transmitting at a second transmission power lower than the first transmission power; and when the base station uses the second channel, designating a first modulation scheme having a lower modulation level from among modulation levels of the modulation schemes. The method may further optionally include, when assigning by the base station the first transmission power using the frequency designed for not causing interference with an adjacent base station, further selecting between the first modulation scheme and a second modulation scheme, having a higher modulation level than the first modulation scheme, depending upon the reception quality. The method may still further optionally include when the reception quality is below a threshold, assigning a first channel with the first modulation scheme and the first transmission power; and when the reception quality is above a threshold, assigning at least one of the first channel and the second channel, and if the first channel is assigned, designating the second modulation scheme, with a higher level of modulation than the first modulation scheme, and if the second channel is assigned, designating the second modulation scheme and the second transmission power level.

In a further exemplary embodiment of the present invention a method is described where when transmission is performed from a terminal device to a base station, a modulation scheme is designated from among at least two modulation schemes with different modulation levels on the basis of reception quality at the base station to perform transmission from the terminal device, wherein the terminal device can use a first channel using a frequency designed for, in a channel allocation scheme, not causing interference with an adjacent base station and a second channel using a frequency different from the first channel. The method includes, when the terminal device uses the second channel, setting as a transmission power a power equivalent to a transmission power used when the first channel is used; and designating a first modulation scheme having a lower modulation level from among modulation levels of the modulation schemes. The method my further optionally include, when the terminal device uses the first channel, further selecting between the first modulation scheme and a second modulation scheme, having a higher modulation level, depending upon the reception quality. And may still further optionally include, when the reception quality is below a threshold, assigning the first channel with the first modulation scheme; and when the reception quality is above a threshold, assigning at least one of the first channel and the second channel, and if the first channel is assigned, designating a second modulation scheme having a higher modulation level, and if the second channel is assigned, designating the first modulation scheme.

According to the present invention, in a mobile communication system that adapts HSDPA and HSUPA schemes to an OFDM scheme, a base station is provided with channels with different transmission powers, and a modulation scheme is changed depending on the communication quality between the base station and a terminal device and the channel used, thus allowing the same channel to be shared between base stations and allowing efficient data communication. For example, a modulation scheme is changed depending upon a threshold level of the communications quality Further, in a mobile communication system that adapts HSDPA and HSUPA schemes to an OFDM scheme, a channel that can be used in an entire cell and a channel that can be used only in a cell center area are provided, and a modulation scheme is changed depending on the communication quality between a base station and a terminal device and the channel used, thus allowing the same channel to be shared between base stations and allowing efficient data communication.

BRIEF DESCRIPTION OF THE DRAWINGS

Embodiments of the present invention will be described with reference to the drawings.

DETAILED DESCRIPTION

As shown in FIG. 1, a mobile communication system is composed of a base station BS and a terminal device MS, and a cell 100 that is a communication area of the base station BS. The cell 100 can be divided into a cell boundary area 101 and a cell center area 102. In the cell boundary area 101, only a first channel (here, CH1) that is assigned so as not to cause interference with an adjacent base station can be used. In the cell center area 102, the first channel (CH1) and a second channel (CH2 and CH3) can be used.

Figure 4:
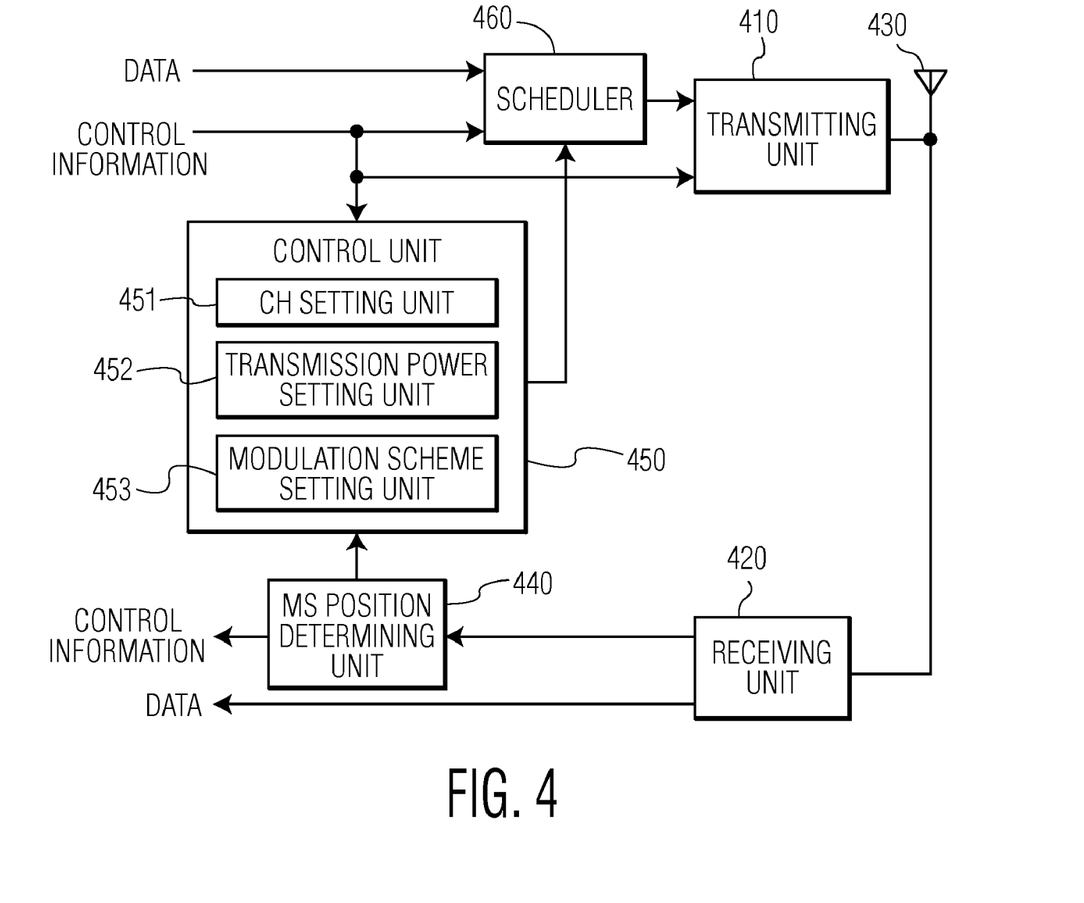
FIG. 4 illustrates an exemplary structure of a base station according to an embodiment of the present invention.

The structure of the base station BS according to a first embodiment of the present invention will be described with reference to FIG. 4. The base station BS includes a transmitting unit 410, a receiving unit 420, an antenna 430, an MS position determining unit 440, a control unit 450, and a scheduler 460.

The antenna 430 receives data transmitted from the terminal device MS. The data is subjected to reception processing such as frequency conversion by the receiving unit 420, and is then sent to the MS position determining unit 440 and a base station control device (not shown).

The MS position determining unit 440 determines whether the terminal apparatus MS is located in the cell center area 102 or the cell boundary area 101 on the basis of the data received from the terminal device MS (for example, on the basis of conventionally used CQI information). The control unit 450 includes a CH setting unit 451, a transmission power setting unit 452, and a modulation scheme setting unit 453, and determines their parameters on the basis of position information and control information of the terminal device MS that are determined by the MS position determining unit 440. The control information is information sent from the base station control device(not shown), and includes information such as the priority of terminal devices MS and the upper limit of the transmission rate with respect to the terminal devices MS. The modulation scheme setting unit 453 is configured to set the modulation scheme as either the QPSK scheme or the 16-QAM scheme.

The scheduler 460 determines the ranks of the terminal devices MS to which data is to be transmitted according to a conventionally used scheduling algorithm on the basis of the control information or the amount of data to be transmitted to the terminal devices, and determines the transmission power, the modulation scheme, etc., in order from a high-rank terminal device. The transmitting unit 410 transmits data through the antenna 430 according to the scheduling information. After the ranks are determined using the scheduler, an actual channel, modulation scheme, and transmission power are determined using, as the upper limit, the channel, modulation scheme, and transmission power determined by the control unit 450.

The HSDPA communication method, except for setting a transmission power and a modulation scheme, is similar to a conventionally used method. That is, a shared channel such as HS-PDSCH is used for transmission of data, and transmission of various control information, such as address information of packet data to be transmitted via the shared channel and the modulation scheme, is performed using a scheduling control channel such as HS-SCCH.

Figure 5:
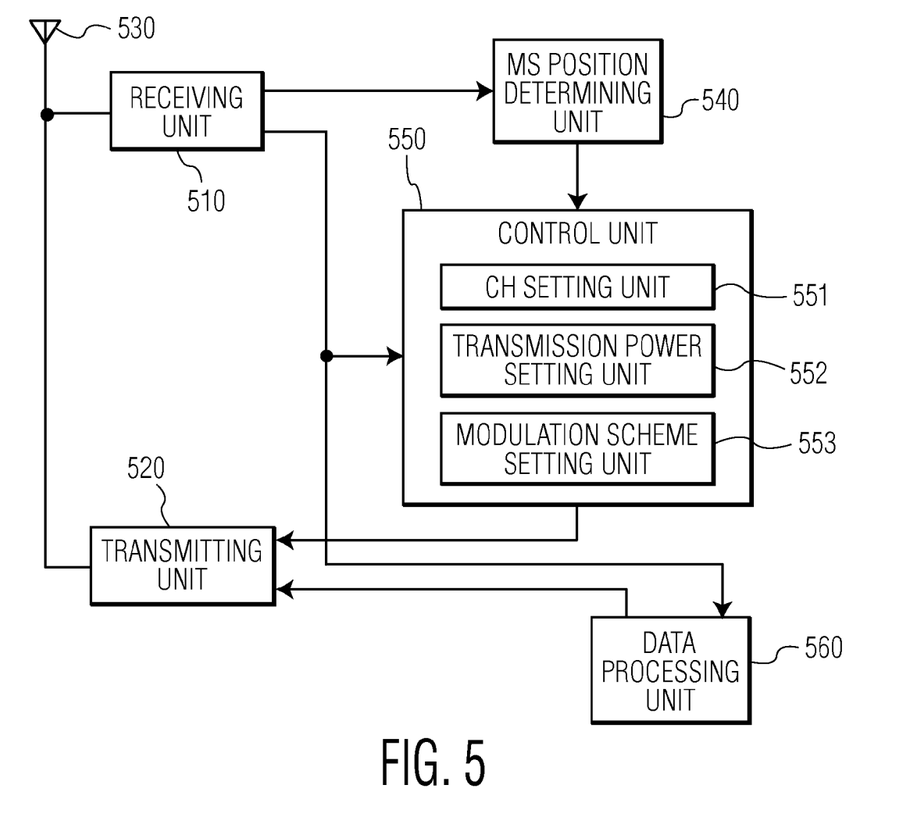
FIG. 5 illustrates an exemplary structure of a terminal device according to an embodiment of the present invention.

FIG. 5 shows the structure of the terminal device MS. The terminal device MS includes a receiving unit 510, a transmitting unit 520, an antenna 530, an MS position determining unit 540, a control unit 550, and a data processing unit 560.

The antenna 530 receives data transmitted from the base station BS. The data is subjected to reception processing such as frequency conversion by the receiving unit 520, and the data reproduced into audio data and/or image data on the basis of the control information and is output by a display device and/or a speaker (not shown).

The MS position determining unit 540 obtains the position of the terminal device MS itself. The position information can be obtained from the control information sent from the base station. The control unit 550 includes a CH setting unit 551, a transmission power setting unit 552, and a modulation scheme setting unit 553, and determines their parameters on the basis of the position of the terminal device MS itself. Like the modulation scheme setting unit 453 of the base station device, the modulation scheme setting unit 553 sets either the QPSK scheme or the 16-QAM scheme.

The data processing unit 560 performs processing, such as storing and converting data, to transmit data to be transmitted to the base station BS (for example, text information or an image created by a user's operation).

Scheduling of data transmission from the terminal device to the base station BS is performed by the base station. The processing method is as follows.

First, the terminal device MS transmits the amount of data stored in the data processing unit 560 and the channel, transmission power, and modulation level determined by the control unit 550 to the base station BS to request scheduling. The base station BS performs scheduling on the basis of the amount of data stored in the data processing unit 560 of the terminal device and the information of the parameters determined by the control unit 550, which are received from the terminal device MS, and transmits a scheduling result to the terminal device MS. The terminal device MS performs processing such as data conversion using the data processing unit 560 on the basis of the scheduling result, and transmits the resulting data to the base station BS. The same scheduler as that for the conventional HSUPA provided in the base station can be used for uplink communication.

Figure 6:
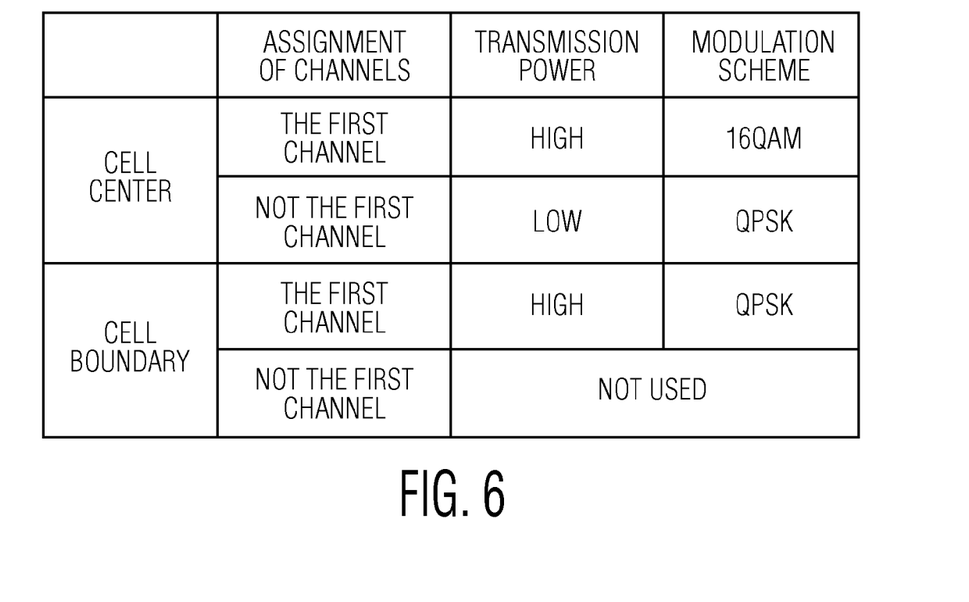
FIG. 6 illustrates an example of a table for assigning a transmission power and a modulation scheme according an Embodiment of the present invention.

FIG. 6 is a table showing an example of how the channel to be used, transmission power, and modulation scheme could be assigned in communication in the downlink direction to a terminal device MS depending upon the location of the terminal device MS. As pointed out herein the location may be determined in a number of ways including by the transmission quality. Thus, a modulation scheme is changed depending upon a threshold level of the communications quality as a non-limiting example.

With regard to the assignment of channels, the frequency reuse distance is changed depending on the distance from the base station to the terminal device. In the cell center area 102, the first and second channels can be used. In the cell boundary area 101, only the first channel, which will not cause interference with an adjacent base station, can be used.

With regard to the transmission power, since HSDPA provides transmission at a power that covers the entire cell 100, transmission at a conventional transmission power is performed for the first channel (CH1) assigned so as not to cause interference with an adjacent base station, and transmission at a power that covers the cell center area 102 is performed for the second channel (CH2 or CH3) that would minimize interference with the adjacent base station. That is, the transmission power used by the second channel is smaller than the transmission power used by the first channel. In the following description, it is assumed that the transmission power at which transmission is performed using the first channel is high, and that the transmission power at which transmission is performed using the second channel is low.

With regard to the modulation scheme, in the conventional HSDPA scheme, the 16-QAM scheme with a high transmission rate is used near the base station (in the cell center area 102) because the communication quality is generally good, and the QPSK scheme is used in a distant area from the base station (the cell boundary area 101) because the communication quality is generally poor. In the present embodiment, when the first channel is used, as in a conventional case, the 16-QAM scheme with high transmission rate is used in the cell center area 102, and the QPSK scheme is used in the cell boundary area 101. When the second channel is used, due to the lower transmission power than that when the first channel is used and the poor communication quality, the QPSK scheme is used. Accordingly, the combination of the channel, transmission power, and modulation scheme to be used is changed depending on which of, the cell center area 102 and the cell boundary area 101, the terminal device MS is located in, thereby reducing interference with an adjacent cell in communication in the downlink direction.

Figure 7:
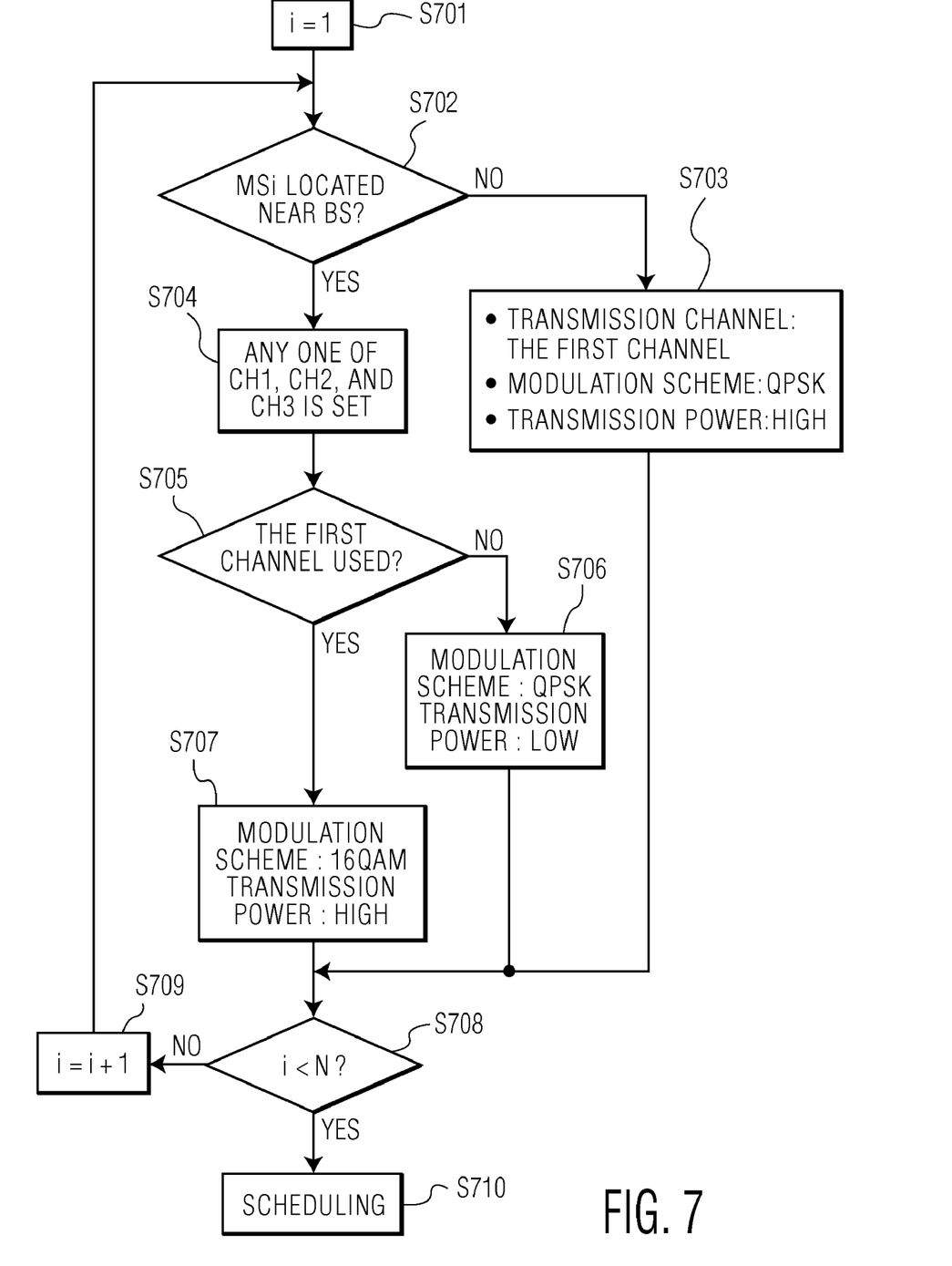
FIG. 7 is a flow diagram showing an exemplary method for assigning parameters according an Embodiment of the present invention.

FIG. 7 is a flowchart diagram showing and example of a method for setting a channel, modulation scheme, and transmission power to be used for data transmission from the base station to the terminal device. The parameters are set according to the table shown in FIG. 6. As in the above description with reference to FIG. 6, it is assumed that the transmission power at which transmission is performed using the first channel (CH1) is high, and that the transmission power at which transmission is performed using the second channel (CH2 or CH3) is low.

If the total number of terminals connected to the base station BS is N and the ith terminal is represented by MS1, the position of the first (i=1) terminal device MS1 is determined (step S701). As discussed above, the method for determining the position is performed on the basis of the quality of the data received from the terminal device MS. Then, it is determined whether or not the terminal device MS is located in the cell center area 102 from the determined position information of the terminal device (step S702). If the terminal device is not located in the cell center area 102, that is, if it is located in the cell boundary area 101, the process proceeds to step S703, in which the transmission channel is set to the first channel (CH1). Further, the transmission power is set to the transmission power (high) used by the first channel, and the modulation scheme is set to the QPSK scheme.

On the other hand, if the terminal device MS is located in the cell center area 102, the process proceeds to step S704, in which the transmission channel is set to any of the CH1, CH2, and CH3. Which channel is to be selected is determined depending on the transmission rate needed. For example, if the maximum transmission rate is needed, all the CH1, CH2, and CH3 may be selected. As the rate decreases, various combinations, such as only CH1;CH1 and the CH2; and only CH3, are conceivable.

Then, it is determined whether or not the transmission channel set in step S704 is the first channel (CH1). If the CH1 is not set, that is, if the second channel (CH2 or CH3) is set, the transmission power is set to the transmission power (low) used by the second channel, and the modulation scheme is set to QPSK (step S706). If the transmission channel set in step S704 is the CH1, the transmission power is set to the transmission power (high) used by the first channel, and the modulation scheme is set to the 16-QAM scheme.

In step S708, it is determined whether or not the settings for all the terminal devices MS connected to the base station BS have been made. If the settings have not been made, the processing of steps S702 to S707 is performed on the (i+1)th terminal device MS. If the settings of the channel, the transmission power, and the modulation scheme have been made for all the terminal devices MS, scheduling for transmitting data from the base station BS to the terminal devices MS is performed (step S710). The scheduling is performed by the scheduler 460, as discussed above.

In this way, in a case where the second channel is used to transmit data to the terminal device MS located in the cell center area 102, a power that covers the cell center area 102 (a lower power than the transmission power used by the first channel) is used, thereby reducing interference with the terminal device MS located in the cell boundary area 101. Further, the modulation scheme of the data to be transmitted from the base station BS to the terminal device MS is set to the QPSK scheme in order to compensate for the gain caused by reducing the transmission power compared with the transmission power used by the first channel, thus maintaining high communication quality with respect to the terminal device MS.

Figure 8:
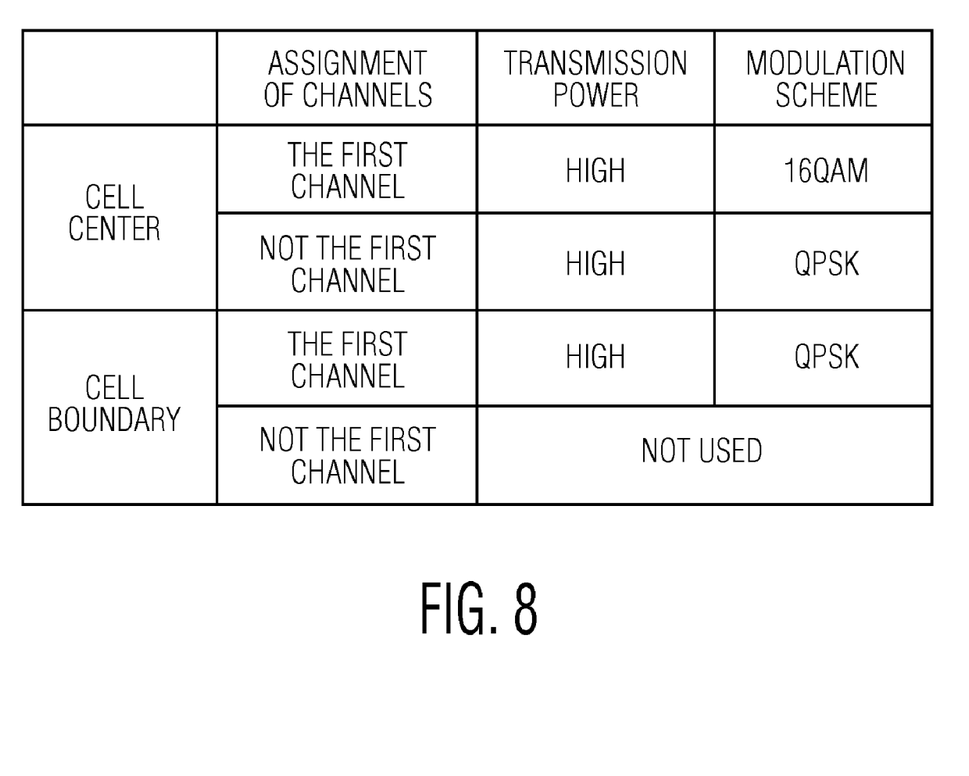
FIG. 8 illustrates an example of a table for assigning a transmission power and a modulation scheme according an Embodiment of the present invention.

The first embodiment has been described in the context of communication in the downlink direction from the base station to the terminal device. A further embodiment will be described in the context of communication in the uplink direction from the terminal device to the base station. The structure of the mobile communication system, the base station BS, and the terminal device MS is similar to that in the first Embodiment, and a description thereof is thus omitted. FIG. 8 shows a table with an example of how the channel used, transmission power, and modulation scheme can be assigned in the uplink direction to the terminal device MS depending upon the location of the terminal device MS.

With regard to the assignment of channels, the frequency reuse distance is changed depending on the distance from the base station to the terminal device MS. The terminal device MS located in the cell center area 102 can use the first channel and the second channel, and the terminal device MS located in the cell boundary area 101 can use only the first channel, which will not cause interference with an adjacent base station.

With regard to the transmission power, since HSUPA provides transmission at a power sufficient to reach the base station BS even though the terminal device MS is located anywhere in the cell 100, transmission at a conventional transmission power is performed for the first channel (CH1) assigned so as not to cause interference with an adjacent base station. It is also necessary to perform transmission at a high power for the second channel (CH2 or CH3) in order to prevent interference from the adjacent base station, and transmission at a transmission power similar to that of the conventional HSUPA is performed. For the sake of consistency in format with the first embodiment, it is assumed that the transmission power used by the first channel and the transmission power used by the second channel are high.

With regard to the modulation scheme, the 16-QAM scheme with high transmission rate is used when the terminal device MS is located near the base station (in the cell center area 102) because the communication quality is good, and the QPSK scheme is used when it is located distant from the base station (in the cell boundary area 101) because the communication quality is poor. In the present embodiment, when the first channel is used, the 16-QAM scheme with high transmission rate is used in the cell center area 102, and the QPSK scheme is used in the cell boundary area 101. When the second channel is used, the QPSK scheme is used because interference may be caused by the transmission from a terminal device located in an adjacent cell thus reducing the communication quality. In HSUPA whose specification is currently being established in 3GPP, QPSK is the only modulation scheme, and the spreading factor can be changed instead of variably setting a modulation scheme. In the following description, the modulation scheme may be substituted by the spread factor.

Accordingly, the combination of the channel, transmission power, and modulation scheme to be used is changed depending on which of the cell center area 102 and the cell boundary area 101 the terminal device MS is located in, thereby minimizing interference with an adjacent cell in communication in the uplink direction.

Figure 9:
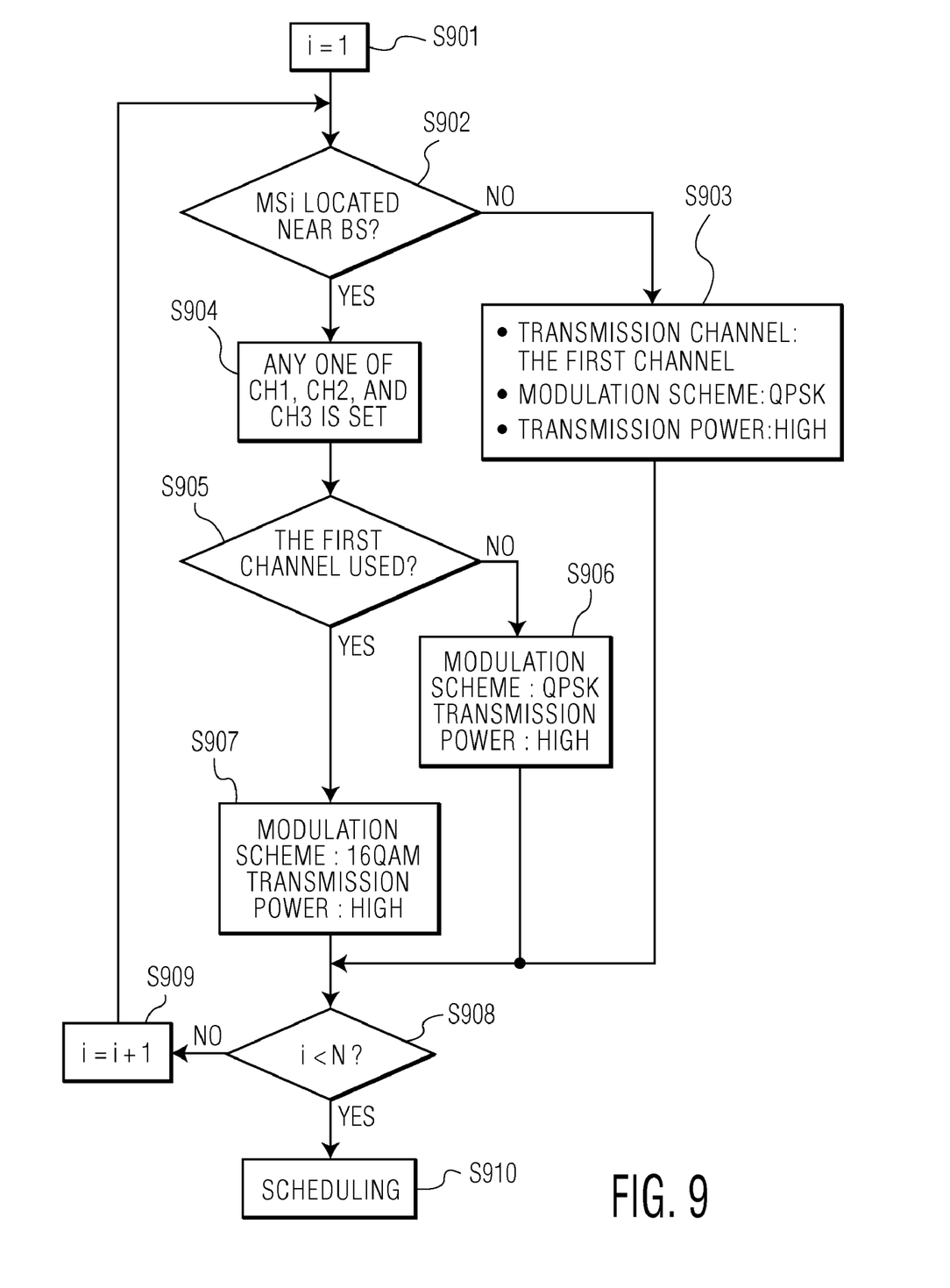
FIG. 9 is a flow diagram showing an exemplary method for assigning parameters according an Embodiment of the present invention.

FIG. 9 is a flowchart diagram showing an example method for setting a channel, modulation scheme, and transmission power to be used for data transmission from the terminal device to the base station. The parameters are set according to the table shown in FIG. 8. As in the above description with reference to FIG. 8, it is assumed that the transmission power at which transmission is performed using the first channel (CH1) and the second channel (CH2 or CH3) is high.

If the total number of terminals connected to the base station BS is N and the ith terminal is represented by MS1, the position of the first (i=1) terminal device MS1 is determined (step S901). As discussed above, the method for determining the position is performed on the basis of the quality of the data received from the base station BS. Then, it is determined whether or not the terminal device MS is located in the cell center area 102 from the determined position information of the terminal device (step S902). If the terminal device is not located in the cell center area 102, that is, if it is located in the cell boundary area 101, the process proceeds to step S903, in which the transmission channel is set to the first channel (here, CH1). Further, the transmission power is set to the transmission power (high) used by the first channel, and the modulation scheme is set to the QPSK scheme.

On the other hand, if the terminal device MS is located in the cell center area 102, the process proceeds to step S904, in which the transmission channel is set to any of CH1, CH2, and CH3. Which channel is to be selected is determined depending on the transmission rate needed. For example, if the maximum transmission rate is needed, all channels CH1, CH2, and CH3 may be selected. As the rate decreases, various combinations, such as only CH1; CH1 and the CH2; and only CH3, are conceivable.

Then, it is determined whether or not the transmission channel set in step S904 is the first channel (CH1). If the CH1 is not set, that is, if the second channel (CH2 or CH3) is set, the transmission power is set to the transmission power (high) used by the second channel, and the modulation scheme is set to QPSK (step S906). If the transmission channel set in step S904 is CH1, the transmission power is set to the transmission power (high) used by the first channel, and the modulation scheme is set to the 16-QAM scheme (S907).

In step S908, it is determined whether or not the settings for all the terminal devices MS connected to the base station BS have been made. If the settings have not been made, the processing of steps S902 to S907 is performed on the (i+1)th terminal device MS. If the settings of the channel, the transmission power, and the modulation scheme have been made for all the terminal devices MS, scheduling for transmitting data from the terminal device MS to the base station BS is performed (step S910). The scheduling is performed by the scheduler included in the base station, as discussed above.

In this way, the QPSK scheme robust to interference is used as the modulation scheme by which the terminal device MS located in the cell center neighboring area 102 transmits data to the base station BS using the second channel, thereby increasing the SIR with respect to the interference received from the terminal device MS2 of the adjacent base station. The base station BS can therefore correctly receive the data.

The present invention is not limited to the Embodiments described above, and a variety of modifications may be made. For example, the Embodiments described above may be implemented in combination, if necessary.

In the present embodiment, the base station performs scheduling in the uplink direction for transmission from the terminal device to the base station, and informs the terminal device MS of the resulting information. However, the terminal device MS may be provided with a scheduler and may perform the scheduling by itself.

While the CH setting unit, the transmission power setting unit, and the modulation scheme setting unit are included in the control unit in the above embodiments, they may be separately provided.

While switching of the modulation scheme between only the QPSK scheme and the 16-QAM scheme has been described, other modulation schemes with different modulation levels, such as 64-QAM, 256-QAM, BPSK, and 8PSK, can be used.

Instead of the modulation scheme or along with the modulation scheme, the spreading factor can be changed.

The description has been made in the context in which when the first channel is used around the center of a cell, a transmission power that covers the entire cell is used and 16-QAM is used as a modulation level. Furthermore, if a small amount of data such as speech is transmitted via a shared channel, it will not be necessary to use 16-QAM. In this case, the QPSK scheme may be used, and the transmission power may be reduced because it is not necessary to cover the entire cell.

While the area in which a terminal device is located is determined on the basis of quality information, if the terminal device has a GPS mounted therein, the area in which the terminal device is located may be determined on the basis of position information obtained from the GPS. Other location methods can equally be applied such as triangulation among base stations.

It should be noted that various modifications, combinations, sub-combinations and alterations of the above-described embodiments may occur, as required, insofar as they are within the scope of the claims or equivalents thereof.

The principles of the present invention may be implemented as a combination of hardware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Moreover, explicit use of the term "software-control unit" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. A processor functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

REFERENCE NUMERALS

MS1, MS2: terminal device
BS1, BS2: base station
100, 100-1, 100-2: cell
101, 101-1, 101-2: cell boundary area
102, 102-1, 102-2: cell center area
410, 510: receiving unit
420, 520: transmitting unit
430, 530: antenna
440, 540: MS position determining unit
450, 550: control unit
451, 551: CH setting unit
452, 552: transmission power setting unit
453, 553: modulation scheme setting unit

What is claimed is:

1. A base station comprising:
a terminal position determining unit configured to determine a relative position of a terminal within a cell radius;
a transmitter configured to transmit a first signal to the terminal; and
a control unit configured to set, in dependence upon the relative position of the terminal, a transmission power and a modulation scheme for communication with the terminal, to at least two downlink channels for transmitting the first signal to the terminal, wherein
the control unit selects, from among the at least two downlink channels, a first downlink channel having a frequency designed for not causing interference with an adjacent base station when the terminal position determining unit determines that the terminal is at a first position relatively distant from the base station within the cell radius, and
the control unit selects, from among the at least two downlink channels, at least one of the first downlink channel and a second downlink channel having a frequency different from that of the first downlink channel when the terminal position determining unit determines that the terminal is at a second position closer than the first position to the base station within the cell radius, wherein
when the first downlink channel is selected, a first modulation scheme is set to the selected first downlink channel in combination with a first transmission power, and
when the second downlink channel is selected, a second modulation scheme having a modulation level lower than the first modulation scheme is set to the selected second downlink channel in combination with a second transmission power lower than the first transmission power, so that a frequency assigned to the selected second downlink channel is reused between adjacent cells without causing interference with each other.

2. The base station of claim 1, further comprising:
a receiver configured to receive a second signal from the terminal, wherein
the relative position of the terminal within the cell radius is determined at the terminal based on a reception quality of the second signal received from the terminal.

3. A terminal in a mobile communication system, comprising:
a terminal position determining unit configured to determine a relative position of the terminal within a cell radius;
a transmitter configured to transmit a first signal to a base station; and
a control unit configured to set, in dependence upon the position of the terminal, a transmission power and a modulation scheme for uplink communication with the base station, to at least two uplink channels for transmitting the first signal to the base station, wherein
the control unit selects, from among the at least two uplink channels, a first uplink channel having a frequency designed for not causing interference with an adjacent base station when the terminal position determining unit determines that the terminal is at a first position relatively distant from the base station within the cell radius, and
the control unit selects, from among the at least two uplink channels, at least one of the first uplink channel and a second uplink channel, the second uplink channel having a frequency different from that of the first uplink channel when the terminal position determining unit determines that the terminal is at a second position closer than the first position to the base station within the cell radius, and wherein
when the first uplink channel is selected, a first modulation scheme is set to the selected first uplink channel in combination with a first transmission power, and
when the second uplink channel is selected, a second modulation scheme having a modulation level lower than the first modulation scheme is set to the selected second uplink channel in combination with the first transmission power, so that a frequency assigned to the second uplink channel is reused between adjacent cells without causing interference with each other.

4. The terminal of claim 3, further comprising:
a receiver configured to receive a second signal from the base station, wherein the relative position of the terminal within the cell radius is determined at the base station on the basis of a reception quality of the second signal.

5. A mobile communication system comprising:
a base station having at least two downlink channels for transmitting a first signal; and
a terminal device configured to receive the first signal from the base station via the at least two downlink channels, wherein
the base station selects, from among the at least two downlink channels, a first downlink channel having a frequency designed for not causing interference with an adjacent base station when the terminal device is at a first position relatively distant from the base station within a cell radius, and
the base station selects, from among the at least two downlink channels, at least one of the first downlink channel and a second downlink channel having a frequency different from that of the first downlink channel when the terminal device is at a second position closer than the first position to the base station within the cell radius, and wherein
when the first downlink channel is selected, a first modulation scheme is set to the selected first downlink channel in combination with a first transmission power, and
when the second downlink channel is selected, a second modulation scheme having a modulation level lower than the first modulation scheme is set to the selected second downlink channel in combination with a second transmission power lower than the first transmission power, so that a frequency assigned to the selected second downlink channel is reused between adjacent cells without causing interference with each other.

6. The mobile communication system of claim 5, wherein the base station receives a second signal from the terminal, and a relative position of the terminal device within the cell radius is determined at the terminal device depending upon a reception quality of the second signal.

7. A mobile communication system comprising:
a base station configured to receive a first signal; and
a terminal device having at least two uplink channels for transmitting the first signal to the base station, wherein
the terminal device selects, from among the at least two uplink channels, a first uplink channel having a frequency designed for not causing interference with an adjacent base station when the terminal device is at a first position relatively distant from the base station within a cell radius, and
the terminal device selects, from among the at least two uplink channels, at least one of the first uplink channel and a second uplink channel, the second uplink channel having a frequency different from that of the first uplink channel when the terminal is at a second position closer than the first position to the base station within the cell radius, and wherein
when the first uplink channel is selected, a first modulation scheme is set to the selected first uplink channel in combination with a first transmission power, and
when the second uplink channel is selected, a second modulation scheme having a modulation level lower than the first modulation scheme is set to the selected second uplink channel in combination with the first transmission power, so that a frequency assigned to the second uplink channel is reused between adjacent cells without causing interference with each other.

8. The mobile communication system of claim 7, wherein the terminal device receives a second signal from the base station, and a relative position of the terminal device within the cell radius is determined at the base station depending upon a reception quality of the second signal.

9. A transmission control method in which transmission is performed from a base station to a terminal device, comprising:
assigning, by the base station, at least two downlink channels for transmitting a signal to the terminal device;
selecting, by the base station, from among the at least two downlink channels, a first downlink channel having a frequency designed for not causing interference with an adjacent base station when the terminal device is at a first position relatively distant from the base station within a cell radius; and
selecting, by the base station, from among the at least two downlink channels, at least one of the first downlink channel and a second downlink channel, the second downlink channel having a frequency different from that of the first downlink channel when the terminal device is at a second position closer than the first position to the base station within the cell radius, wherein
when the first downlink channel is selected, the first modulation scheme is set to the selected first downlink channel in combination with the first transmission power, and
when the second downlink channel is selected, a second modulation scheme having a modulation level lower than the first modulation scheme is set to the selected second downlink channel in combination with a second transmission power lower than the first transmission power, so that a frequency assigned to the selected second downlink channel is reused between adjacent cells without causing interference with each other.

10. The method of claim 9, wherein
it is determined that the terminal device is at the first position relatively distant from the base station within the cell radius when a reception quality of the signal at the terminal device is below a threshold, and it is determined that the terminal device is at the second position closer than the first position to the base station within the cell radius when the reception quality of the signal at the terminal device is above the threshold.

11. A transmission control method in which transmission is performed from a terminal device to a base station, comprising:
providing at least two uplink channels for transmitting a signal from the terminal device to the base station;
selecting, by the terminal device, from among the at least two uplink channels, a first uplink channel having a frequency designed for not causing interference with an adjacent base station when the terminal device is at a first position relatively distant from the base station within a cell radius; and
selecting, by the terminal device, from among the at least two uplink channels, at least one of the first uplink channel and a second uplink channel having a frequency different from that of the first uplink channel when the terminal device is at a second position closer than the first position to the base station within the cell radius, wherein when the first uplink channel is selected, a first modulation scheme is set to the selected first uplink channel in combination with a first transmission power, and
when the second uplink channel is selected, a second modulation scheme having a modulation level lower than the first modulation scheme is set to the selected second uplink channel in combination with the first transmission power, so that a frequency assigned to the second uplink channel is reused between adjacent cells without causing interference with each other.

12. The transmission control method of claim 11, wherein
it is determined that the terminal device is at the first position relatively distant from the base station within the cell radius when a reception quality of the signal at the base station is below a threshold, and
it is determined that the terminal device is at the second position closer than the first position to the base station within the cell radius when the reception quality of the signal at the base station is above the threshold.

* * * * *